(12) United States Patent
Lee (10) Patent No.: US 9,378,125 B2
(45) Date of Patent: Jun. 28, 2016

(54) SEMICONDUCTOR CHIP AND METHOD OF CONTROLLING MEMORY

(71) Applicant: Foundation of Soongsil University-Industry Cooperation, Seoul (KR)

(72) Inventor: Chan-Ho Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 205 days.

(21) Appl. No.: 13/723,798

(22) Filed: Dec. 21, 2012

(65) Prior Publication Data
US 2013/0185525 A1 Jul. 18, 2013

(30) Foreign Application Priority Data
Dec. 27, 2011 (KR) ......................... 10-2011-0143376

(51) Int. Cl.
*G06F 12/00* (2006.01)
*G06F 13/16* (2006.01)

(52) U.S. Cl.
CPC ............. *G06F 12/00* (2013.01); *G06F 13/1621* (2013.01); *G06F 13/1631* (2013.01); *Y02B 60/1228* (2013.01)

(58) Field of Classification Search
CPC ............. G06F 13/1621; G06F 13/1626; G06F 13/1631; G06F 13/1636; G06F 13/1642; G06F 13/1684; G06F 13/1647; G06F 13/1657; G06F 12/0607; G06F 12/0215; G06F 12/1684
USPC ........................................................ 711/103
See application file for complete search history.

(56) References Cited

U.S. PATENT DOCUMENTS

| 4,866,603 A | * | 9/1989 | Chiba ..................... G06F 12/04 711/157 |
| 5,313,603 A | * | 5/1994 | Takishima .......... G06F 13/1647 711/157 |

(Continued)

FOREIGN PATENT DOCUMENTS

| GB | 2461768 A | * | 1/2010 | .............. H04L 47/10 |
| KR | 1020010019127 A | | 3/2001 | |

(Continued)

OTHER PUBLICATIONS

Narayan, Implementation of mutual exclusion in wireless networks with emphasis on low service times. IEEE, 10th International conference on telecommunications, 2003. p. 872-876.*

*Primary Examiner* — Jared Rutz
*Assistant Examiner* — Khoa D Doan
(74) *Attorney, Agent, or Firm* — Novick, Kim & Lee, PLLC; Sang Ho Lee (57) ABSTRACT

Disclosed herein are a semiconductor chip for adaptively processing a plurality of commands to request memory access, and a method of controlling memory. The semiconductor chip includes a storage unit ad a control unit. The storage unit stores a memory access request to be currently processed and a plurality of memory access requests received before the memory access request to be currently processed in received order. The control unit processes the memory access request to be currently processed and the plurality of memory access requests received before the memory access request to be currently processed, which have been stored in the storage unit, in received order, except that memory access requests attempting to access the same bank and the same row are successively processed.

7 Claims, 8 Drawing Sheets

(56) References Cited

U.S. PATENT DOCUMENTS

| | | | | |
|---|---|---|---|---|
| 6,145,063 A * | 11/2000 | Ueno et al. | | 711/157 |
| 6,173,378 B1 * | 1/2001 | Rozario | | G06F 13/18 |
| | | | | 365/230.05 |
| 6,374,323 B1 * | 4/2002 | Stracovsky | | G06F 12/0215 |
| | | | | 365/230.03 |
| 6,385,708 B1 * | 5/2002 | Stracovsky | | G06F 12/0215 |
| | | | | 711/151 |
| 6,526,484 B1 * | 2/2003 | Stacovsky | | G06F 13/1626 |
| | | | | 710/39 |
| 6,539,457 B1 * | 3/2003 | Mulla | | G06F 12/0897 |
| | | | | 711/117 |
| 6,564,304 B1 * | 5/2003 | Van Hook | | G06F 13/1642 |
| | | | | 345/535 |
| 6,578,117 B2 * | 6/2003 | Weber | | G06F 9/5016 |
| | | | | 711/151 |
| 6,601,151 B1 * | 7/2003 | Harris | | G06F 13/1642 |
| | | | | 711/158 |
| 6,622,225 B1 * | 9/2003 | Kessler | | G06F 13/1642 |
| | | | | 711/105 |
| 6,628,292 B1 * | 9/2003 | Ashburn | | G09G 5/39 |
| | | | | 345/531 |
| 6,804,738 B2 * | 10/2004 | Weber | | G06F 9/4887 |
| | | | | 370/395.21 |
| 6,877,077 B2 * | 4/2005 | McGee | | G06F 13/1642 |
| | | | | 710/39 |
| 6,886,048 B2 * | 4/2005 | Richard | | G06F 13/1626 |
| | | | | 710/310 |
| 6,938,133 B2 * | 8/2005 | Johnson | | G06F 13/1642 |
| | | | | 710/309 |
| 7,069,399 B2 * | 6/2006 | Lin | | G06F 13/1631 |
| | | | | 711/158 |
| 7,114,026 B1 * | 9/2006 | Khanna | | H04L 45/7453 |
| | | | | 365/49.18 |
| 7,215,659 B1 * | 5/2007 | Chen | | H04W 16/14 |
| | | | | 370/338 |
| 7,219,187 B1 * | 5/2007 | Khanna | | H04L 45/00 |
| | | | | 365/49.17 |
| 7,426,621 B2 * | 9/2008 | Kommrusch | | G06F 13/1631 |
| | | | | 710/124 |
| 7,707,384 B1 * | 4/2010 | Dally | | G11C 8/04 |
| | | | | 365/230.01 |
| 7,899,994 B2 * | 3/2011 | Zhao | | G06F 12/126 |
| | | | | 711/133 |
| 8,166,237 B1 * | 4/2012 | Atsatt | | G11C 7/00 |
| | | | | 711/105 |
| 8,180,975 B2 * | 5/2012 | Moscibroda et al. | | 711/151 |
| 8,271,700 B1 * | 9/2012 | Annem | | G06F 13/28 |
| | | | | 710/22 |
| 2002/0191622 A1 * | 12/2002 | Zdan | | H04L 45/00 |
| | | | | 370/401 |
| 2003/0074507 A1 * | 4/2003 | Weber | | G06F 9/4887 |
| | | | | 710/240 |
| 2003/0074519 A1 * | 4/2003 | Weber | | G06F 13/1621 |
| | | | | 711/105 |
| 2004/0022101 A1 * | 2/2004 | Boldt | | G11C 29/26 |
| | | | | 365/200 |
| 2004/0088450 A1 * | 5/2004 | Dodd | | G06F 13/1626 |
| | | | | 710/52 |
| 2004/0139286 A1 * | 7/2004 | Lin | | G06F 13/1631 |
| | | | | 711/151 |
| 2005/0097265 A1 * | 5/2005 | Shrader | | G06F 13/1668 |
| | | | | 711/105 |
| 2005/0125620 A1 * | 6/2005 | Parthasarathy | | G06F 12/0215 |
| | | | | 711/167 |
| 2006/0059320 A1 * | 3/2006 | Akizuki | | G06F 12/0607 |
| | | | | 711/158 |
| 2006/0155938 A1 * | 7/2006 | Cummings | | G11C 7/1048 |
| | | | | 711/149 |
| 2006/0168399 A1 * | 7/2006 | Chen | | G06F 8/4442 |
| | | | | 711/118 |
| 2006/0187942 A1 * | 8/2006 | Mizutani | | H04L 12/5695 |
| | | | | 370/401 |
| 2006/0215481 A1 * | 9/2006 | Dally | | G11C 7/1006 |
| | | | | 365/233.5 |
| 2007/0101075 A1 * | 5/2007 | Jeddeloh | | G06F 13/1626 |
| | | | | 711/158 |
| 2007/0121499 A1 * | 5/2007 | Pal et al. | | 370/230 |
| 2007/0294471 A1 * | 12/2007 | Calvignac | | G06F 13/1642 |
| | | | | 711/105 |
| 2008/0104340 A1 * | 5/2008 | Shih | | G06F 13/161 |
| | | | | 711/154 |
| 2008/0114921 A1 * | 5/2008 | Park et al. | | 711/5 |
| 2008/0133809 A1 * | 6/2008 | Saito | | G06F 13/1647 |
| | | | | 710/106 |
| 2008/0189479 A1 * | 8/2008 | Cope | | G06F 13/1647 |
| | | | | 711/104 |
| 2009/0150624 A1 * | 6/2009 | Resnick | | G06F 9/3004 |
| | | | | 711/155 |
| 2009/0157964 A1 * | 6/2009 | Kasorla | | G06F 12/0246 |
| | | | | 711/118 |
| 2009/0248994 A1 * | 10/2009 | Zheng | | G06F 9/5016 |
| | | | | 711/151 |
| 2009/0327571 A1 * | 12/2009 | Ichiguchi | | G06F 13/1605 |
| | | | | 711/5 |
| 2010/0100670 A1 * | 4/2010 | Jeddeloh | | G06F 13/1626 |
| | | | | 711/105 |
| 2010/0211935 A1 * | 8/2010 | Weber | | H04L 12/5695 |
| | | | | 717/127 |
| 2010/0299488 A1 * | 11/2010 | Ping | | G06F 12/10 |
| | | | | 711/154 |
| 2010/0329119 A1 * | 12/2010 | Zorba Barah | | H04W 72/087 |
| | | | | 370/235 |
| 2011/0022812 A1 * | 1/2011 | van der Linden | | G06F 9/5077 |
| | | | | 711/163 |
| 2011/0066821 A1 * | 3/2011 | Rijshouwer | | G11C 7/1006 |
| | | | | 711/165 |
| 2011/0099341 A1 * | 4/2011 | Resnick | | G06F 9/3004 |
| | | | | 711/155 |
| 2011/0191517 A1 * | 8/2011 | James | | G06F 13/1642 |
| | | | | 710/308 |
| 2011/0254590 A1 * | 10/2011 | Venkatramani et al. | | 326/52 |
| 2012/0069034 A1 * | 3/2012 | Biswas | | G06F 9/5033 |
| | | | | 345/531 |
| 2012/0072678 A1 * | 3/2012 | Biswas | | G06F 13/1694 |
| | | | | 711/154 |
| 2012/0159088 A1 * | 6/2012 | Balkan | | G06F 13/1668 |
| | | | | 711/147 |
| 2012/0236716 A1 * | 9/2012 | Anbazhagan | | H04L 41/5022 |
| | | | | 370/235 |
| 2012/0238275 A1 * | 9/2012 | Galwas | | H04W 28/12 |
| | | | | 455/445 |
| 2012/0278583 A1 * | 11/2012 | Woo | | G06F 9/52 |
| | | | | 711/169 |
| 2012/0331197 A1 * | 12/2012 | Campbell et al. | | 710/117 |
| 2013/0066951 A1 * | 3/2013 | Agranat | | H04J 14/0227 |
| | | | | 709/203 |
| 2013/0091237 A1 * | 4/2013 | Arulambalam | | H04L 65/60 |
| | | | | 709/213 |
| 2013/0159633 A1 * | 6/2013 | Lilly | | G06F 12/084 |
| | | | | 711/146 |
| 2013/0173841 A1 * | 7/2013 | Venkatramani | | G06F 12/0607 |
| | | | | 711/5 |

FOREIGN PATENT DOCUMENTS

| | | |
|---|---|---|
| KR | 1020020040150 A | 5/2002 |
| KR | 1020090092004 A | 8/2009 |

* cited by examiner

FIG. 9 ized chip and a method of controlling memory and, more particularly, to a semiconductor chip and a method of controlling memory, which are capable of adaptively processing a plurality of commands to access memory in a system-on-chip (SOC) based system.

SEMICONDUCTOR CHIP AND METHOD OF CONTROLLING MEMORY

PRIORITY

This application claims priority to and the benefit of Korean Patent Application No. 2011-0143376, filed on Dec. 27, 2011, the disclosure of which is incorporated herein by reference in its entirety.

BACKGROUND OF THE INVENTION

1. Field of the Invention

The present invention relates generally to a semiconductor chip and a method of controlling memory and, more particularly, to a semiconductor chip and a method of controlling memory, which are capable of adaptively processing a plurality of commands to access memory in a system-on-chip (SOC) based system.

2. Description of the Related Art

Because of the worldwide smart phone and tablet personal computer (PC) boom, the development of a variety of application processors (APs) has been brought about, and system-on-chips (SOCs) in a variety of fields have come to have a platform structure similar to that of application processors. Such an SOC is characterised in that a plurality of processors or masters is provided therein and shares single memory. In particular, there are many cases in which the performance of systems for processing multimedia data, such as a moving image or music, or for processing a large amount of data at high speed so as to perform recognition and authentication is dependent chiefly on memory access. That is, if memory does not provide sufficient bandwidth, a master, such as a processor or a hardware accelerator, waits for data and experiences a reduction in performance. If only the bandwidth is problematic, the problem may be solved by using high-speed memory or adding dedicated memory, in which case a new problem, such as an increase in cost or the redesign of a system, frequently occurs. Furthermore, the memory access request of a microprocessor for a general instruction is sensitive to a latency and the memory access request of a multimedia hardware accelerator or a microprocessor for multimedia data is sensitive to the sustainable bandwidth, and thus the requirements are different. In order to solve this problem, the system-level control of memory access requests is required. It is very inefficient for a single processor to receive the states of all masters to arbitrate, and to issue control commands. Another approach is for a memory controller to collect memory access commands and to arbitrate so that system performance is optimized. In this case, the transfer of additional information describing of the characteristics of each memory access command is necessary.

ARM's Advanced High-performance Bus (AHB) has been widely used as an interface protocol for the transfer of data inside an SOC. The AHB standard allows up to 16 masters, which is effective when the sum of bandwidths required by respective masters is considerably less than the overall bandwidth. If the sum of bandwidths required by respective masters becomes similar to the bandwidth provided by a network, a problem arises even when there are two masters. Although the bandwidth can be considerably increased using an interconnect matrix, it is hardly helpful in the case in which communication is concentrated on shared memory. Another problem of the AHB resides in the fact that it is impossible to perform the operation of arbitrating memory access requests because another master cannot access memory because of stop-and-wait type communication during single memory access communication, and thus a memory controller should sequentially process memory access requests one by one. Although a number of commands equal to the number of interfaces may be processed at one time by increasing the number of slave interfaces, the improvement of performance is not significant in normal cases because of the limitations in which an interconnect matrix should be used and a response should be made via a channel while the corresponding channel is kept open.

In order to solve the problems of the AHB, ARM's AXI supports outstanding addresses and out-of-order completion communication in a multiple master system and allows register slicing in a network, thereby enabling high-speed operation. Accordingly, since it is possible to handle another memory access request prior to responding to one memory access request, a memory controller can arbitrate between access requests. Using this, the effective bandwidth can be increased by reducing the waiting cycles for memory access, and the demand for Quality of Service (QoS) can be met by adjusting the order of priority.

The prior art related to the above technology will be described in greater detail. Korean Patent Application Publication No. 10-2002-0040150 entitled "Synchronous Dynamic Random Access Memory (SDRAM) controller" discloses a controller that adopts SOC technology arid contains a memory controller and a variety of types of data or signal processing devices along with SDRAM, thereby improving data transfer efficiency by solving the discrepancy between the data width and the operating frequency between related chips. However, this technology does not take into consideration of the method or sequence of processing multiple commands that attempt to access SDRAM.

Korean Patent Application Publication No. 10-2001-0019127 entitled "External Bus Controller supporting Burst Transfer using MPC860 Processor and SDRAM and Method Thereof" discloses the structure of an external bus controller that provides the maximum performance of a processor, SDRAM and a peripheral component interconnect (PCI) external bus in a variety of processor boards using MPC860 and SDRAM, and an external bus controller that provides the user programmable machine (UPM) of MPC860. This technology is also different from the present invention that is intended to efficiently process multiple commands that attempt to access SDRAM.

SUMMARY OF THE INVENTION

Accordingly, the present invention has been made keeping in mind the above problems occurring in the prior art, and an object of the present invention is to provide a semiconductor chip and a method of controlling memory, which align a plurality of memory access requests, thereby reducing the waiting time and also maximally utilizing the bandwidth.

Another object of the present invention is to provide a semiconductor chip and a method of controlling memory, which store commands to request memory access in a storage unit, analyze the commands, and arbitrate and re-order the commands so that the operations of newly opening a row of a bank can be minimized and commands to request QoS can be processed preferentially.

In order to accomplish the above objects, the present invention provides a semiconductor chip for adaptively processing a plurality of commands to request memory access, including a storage unit configured to store a memory access request to be currently processed and a plurality of memory access requests received before the memory access request to be currently processed in received order; and a control unit configured to process the memory access request to be currently processed and the plurality of memory access requests received before the memory access request to be currently processed, which have been stored in the storage unit, in received order, except that memory access requests attempting to access the same bank and the same row are successively processed.

Additionally, in order to accomplish the above objects, the present invention provides a method of controlling memory, the method being performed by an apparatus for controlling semiconductor chip memory for adaptively processing a plurality of commands to request memory access, the method comprising the steps of (a) storing a memory access request to be currently processed and a plurality of memory access requests received before the memory access request to be currently processed in a storage unit in received order, and analyzing memory addresses that the requests attempt to access in reverse order; and (b) if it is determined that there is a request attempting to access the same bank and row as the memory access request to be currently processed based on the memory addresses analysed in reverse order, placing the memory access request to be currently processed after the request attempting to access the same bank and row.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

A method of controlling memory according to an embodiment of the present invention will be described in detail with reference to the accompanying drawings.

Figure 1:
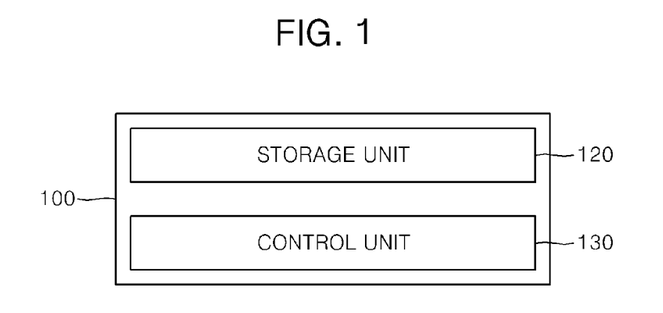
FIG. 1 is a block diagram showing a semiconductor chip according to the present invention.
Figure 2:
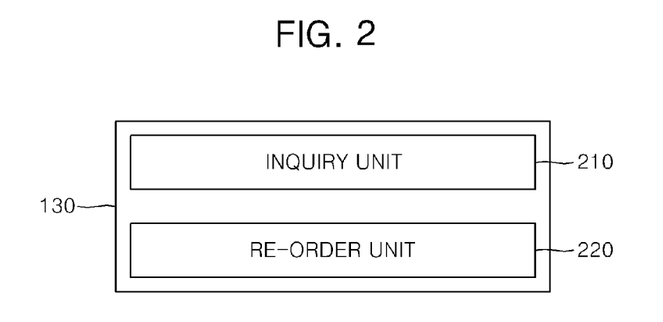
FIG. 2 is a block diagram showing the detailed configuration of the control unit of the semiconductor chip 100 according to the present invention.

FIG. 1 is a block diagram showing a semiconductor chip 100 according to the present invention, and FIG. 2 is a block diagram showing the detailed configuration of the control unit 130 of the semiconductor chip 100 according to the present invention.

Referring to FIG. 1, the semiconductor chip 100 according to the present invention includes a storage unit 120 and a control unit 130.

The storage unit 120 stores a memory access request to be currently processed and a plurality of memory access requests previously received in received order. Here, memory may be integrated with the storage unit 120, and may be one of a variety of storage media, including registers.

The control unit 130 processes the memory access request to be currently processed and the plurality of memory access requests previously received, which are stored in the storage unit 120, in received order, and performs control so that memory access requests for the same bank and the same row can be successively processed. Referring to FIG. 2, the control unit 130 includes an inquiry unit 210 and a re-ordering unit 220. The inquiry unit 210 inquires the memory addresses that the memory access request to be currently processed and the plurality of memory access requests previously received attempt to, in reverse order, and the re-ordering unit 220 re-orders the plurality of memory access requests based on the inquired memory addresses.

That is, the re-ordering unit 220 re-orders the plurality of memory access requests in such a way that i) if there is a QoS request, the QoS request is placed in front of a plurality of memory access requests, ii) the normal memory access requests are placed in received order except that memory access requests attempting to access the same bank and the same row are successively placed, and iii) otherwise adjacent requests are placed so that they access different banks with effort. Furthermore, an excessive access to a row in a bank is prevented from occurring by limiting the number of successive accesses to a specific bank and row. This maximally decreases waiting cycles attributable to memory access, and improves the overall memory access efficiency of the system. This will be described in greater detail below.

If there is a first QoS request, the re-ordering unit 220 places the first QOS request in the foremost part of the storage unit 120 because the first QoS request should be processed earlier than a plurality of memory access requests, and places the first QoS request after a second QOS request if there is a second QoS request received before the first QOS request. Since such a QoS request is used to request communication that guarantees specified bandwidth for a network and a destination, the QoS request should be processed preferentially. There may be a various types of QoS, and there may be predetermined order of priority therebetween. If there is a priority policy between QoS requests, commands may be executed in the order of priority, which may vary according to network protocols.

Furthermore, the alignment unit 220 places a memory access request to be currently processed after a request attempting to access the same bank and the same row as one memory access request to be currently processed so that the memory access request to be currently processed and the request attempting the same bank and the same row can be successively processed based on the memory addresses inquired by the inquiry unit 210 in reverse order. Furthermore, if there is a plurality of successive requests attempting the same bank and the same row as a memory access request to be currently processed, the memory access request to be currently processed is placed after the last of the plurality of successive requests. Here, the number of requests attempting to access the same bank and the same row should not exceed a preset number. The reason why it is determined whether the number of successive requests is within the preset number is that it is necessary to limit the number of accesses to a specific row of a specific bank because subsequent requests may be delayed excessively if there are an excessive number of requests for the specific row of the specific bank. The preset number may vary according to the application range.

Furthermore, if there is no request attempting to access the same bank and the same row as a memory access request to be currently processed based on the memory addresses inquired by the inquiry unit 210 in reverse order, the re-ordering unit 220 places the first memory access request before an n-th request which is the last memory access request in the storage unit 120 if the addresses of memory that the n-th request and an (n−1)-th request which is in front of the n-th request attempt to access correspond to different rows of the same bank and the banks that the n-th request and the memory access request to be currently processed attempt to are different from each other. That is, the last three requests do not access the same bank continuously by placing the memory access request to be currently processed before the n-th request.

Furthermore, if it is determined that there is no request attempting to access the same bank and the same row as the memory access request to be currently processed based on the memory addresses inquired by the inquiry unit 210 in reverse order, the re-ordering unit 220 compares a memory address that an n-th request which is the last memory access request in the storage unit 120 with a memory address that an (n−1)-th request attempts to access. If these requests attempt to access different rows of the same bank, and banks that the n-th request and the memory access request to be currently processed attempt to access are the same, the re-ordering unit 220 compares the (n−1)-th request with its previous other requests, places the (n−1)-th request before a closest request attempting to access a bank different from the bank that the (n−1)-th request attempts to access, and places the memory access request to be currently processed after the n-th request. This prevents the operation of opening and closing rows of a bank from being successively performed three times.

Furthermore, if it is determined that there is no request attempting to access the same bank and the same row as the memory access request to be currently processed based on the memory addresses inquired by the inquiry unit 210 in reverse order, the re-ordering unit 220 compares a memory address that an n-th request which is the last memory access request in the storage unit 120 with a memory address that an (n−1)-th request attempts to access. If the banks of the memory addresses are different, the memory access request to be currently processed is placed after the n-th request. If the n-th request and the (n−1)-th request attempt to access different banks, there is no benefit that can be obtained when the memory access request to be currently processed is placed between the n-th request and the (n−1)-th request, and therefore the memory access request to be currently processed is placed after the n-th request.

Figure 3A:
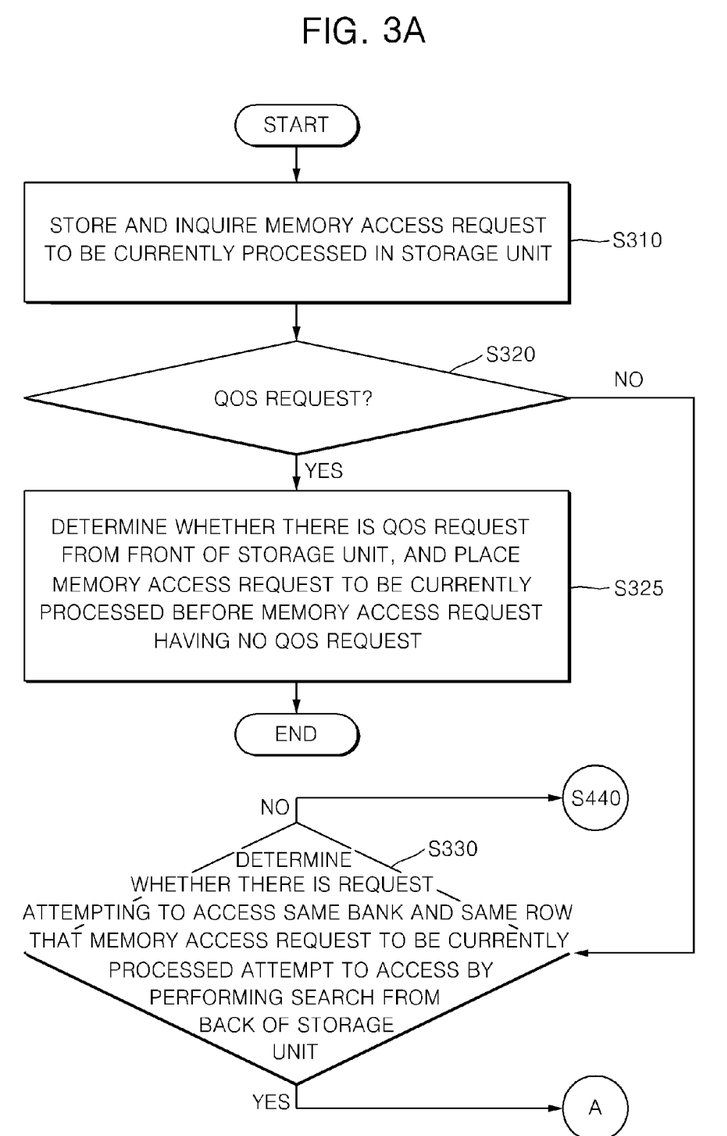
FIGS. 3A and 3B are flowcharts showing a method of controlling memory according to a first embodiment of the present invention.
Figure 3B:
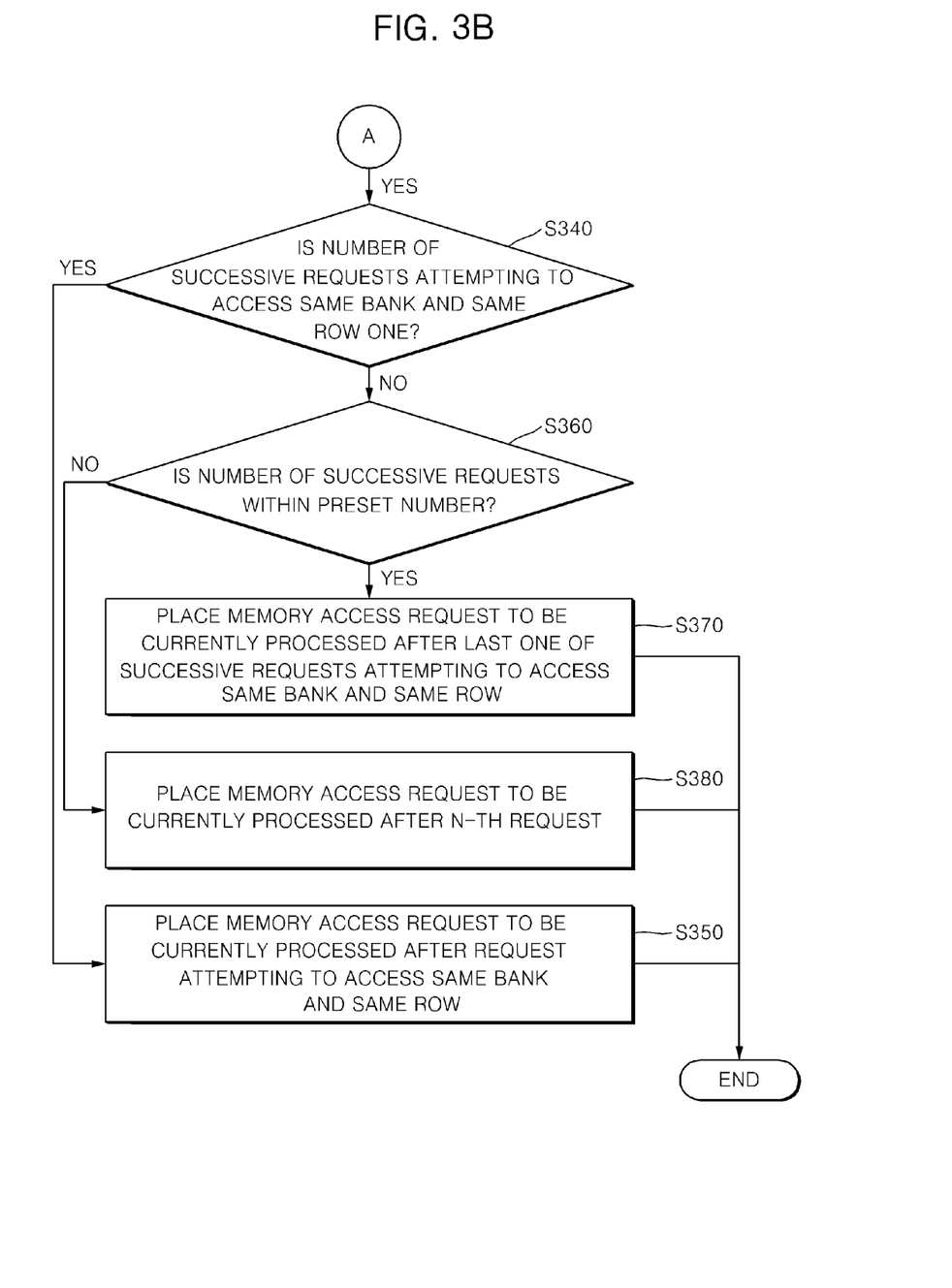
Figure 4:
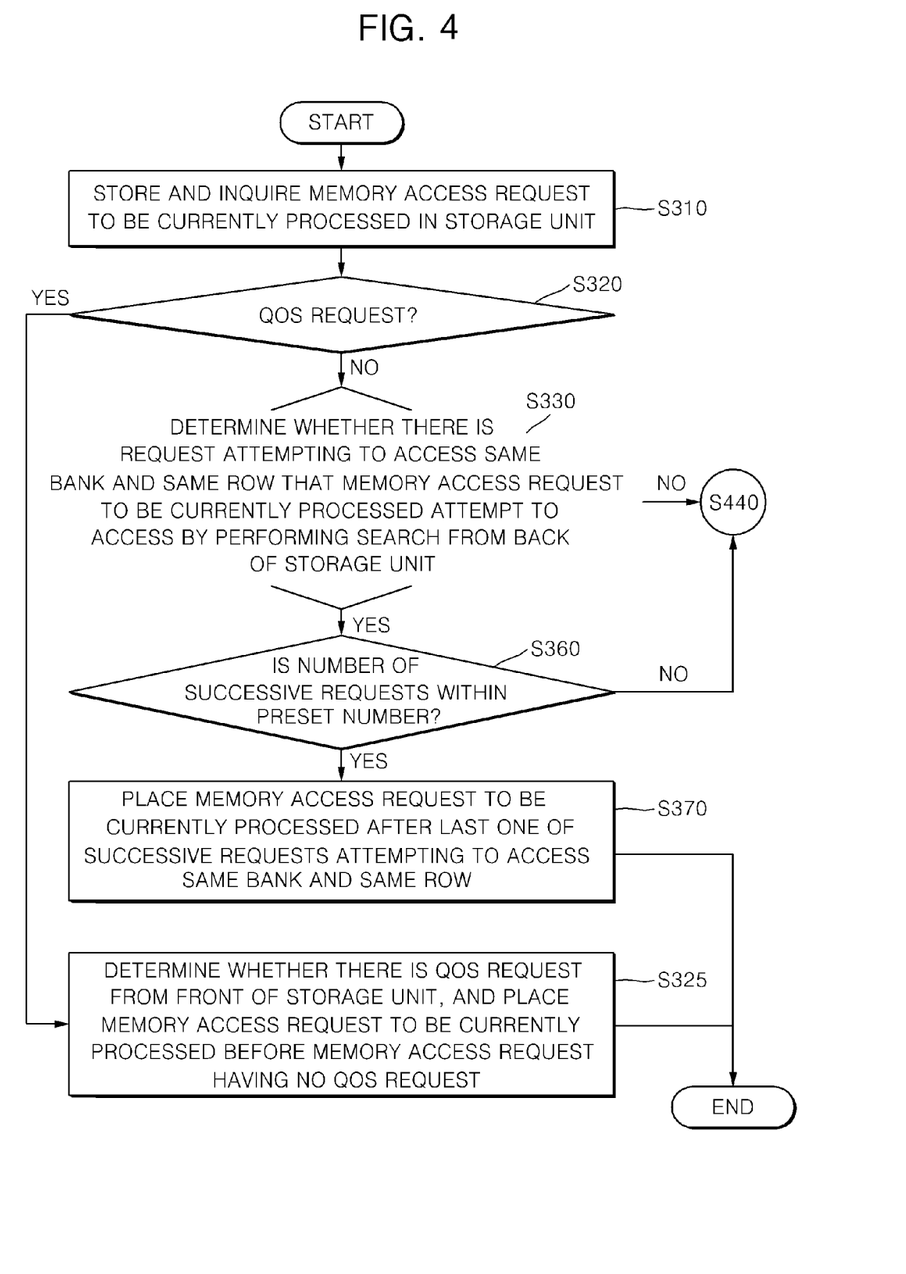
FIG. 4 is a flowchart showing a method of controlling memory according to a second embodiment of the present invention.

FIGS. 3A and 3B are flowcharts showing a method of controlling memory according to a first embodiment of the present invention, and FIG. 4 is a flowchart showing a method of controlling memory according to a second embodiment of the present invention.

Referring to FIGS. 3A and 3B, first, a memory access request to be currently processed is stored in the storage unit 120 and then inquired at step S310. There may be a plurality of other memory access requests before the memory access request to be currently processed, and the plurality of other memory access requests are stored in the storage unit 120. The memory access request to be currently processed is checked if it is a QoS request at step S320.

If there is a QoS request, the QoS request should be processed earlier than the plurality of normal memory access requests stored in the storage unit 120, and therefore the QoS request is placed in the foremost part of the storage unit 120 at step S325. Furthermore, if there is a plurality of QoS requests, a new QoS request is placed after previously received QoS requests in order to allow the previously received QoS requests to be processed earlier at step S325. Since such a QoS request is used to request communication that guarantees specified bandwidth for a network and a destination, the QoS request should be preferentially processed. There may be a variety of types of QoS, and there may be a predetermined priority policy therebetween. If there is an priority policy between QoS requests, commands may be executed in order of priority, which may vary according to network protocol.

If there is no QoS request, it is determined whether there is a request attempting to access the same bank and the same row by comparing a memory address that the memory access request to be currently processed attempts to access with those the plurality of memory access requests stored in the storage unit 120 attempt to access at step S330. In this case, it is determined whether there is a request that meets the corresponding condition by searching the plurality of memory access requests stored in the storage unit 120 in reverse order. This is intended to process the memory access requests in the received order in principle. Since the number of operations of opening and closing a row should be minimized, it is preferred that, if there are requests attempting to access the same row of the same bank, the requests be successively placed. However, since the order of request should be taken into consideration, a request meeting the desired condition is searched for from the back of the storage unit 120 and the current request is placed after the found request.

If, as a result of the comparison, there is a request attempting to access the same bank and the same row as the memory access request to be currently processed, it is determined whether the number of successive requests is one, or two or more, at step S340. If the number of requests attempting to access the same bank and the same row as the memory access request to be currently processed is one, the memory access request to be currently processed is placed after the one request at step S350. In contrast, if the number of successive requests attempting to access the same bank and the same row as the memory access request to be currently processed is two or more, the memory access request to be currently processed is placed after the last one of the requests which attempt to access the same bank and the same row at step S370. However, in this case, it should be determined whether the number of successive requests is within a preset number at step S360. If the number of successive requests exceeds the preset number, the memory access request to be currently processed is placed after an n-th (the last) request at step S380. The reason why it is determined whether the number of successive requests is within the preset number is that it is necessary to limit the number of accesses to a specific row of a specific bank because subsequent requests may be delayed excessively if there are an excessive number of requests for the specific row of the specific bank. The preset number may vary according to the application.

Furthermore, as shown in FIG. 4, if the number of successive requests exceeds the preset number at step S360, the case may be processed in the same manner as the case in which there is no request attempting to access the same bank and the same row as the memory access request to be currently processed at step S440. This is more effective than the method that is configured to perform step S380 if the number of successive requests exceeds the preset number and that is illustrated in FIGS. 3A and 3B.

Figure 5A:
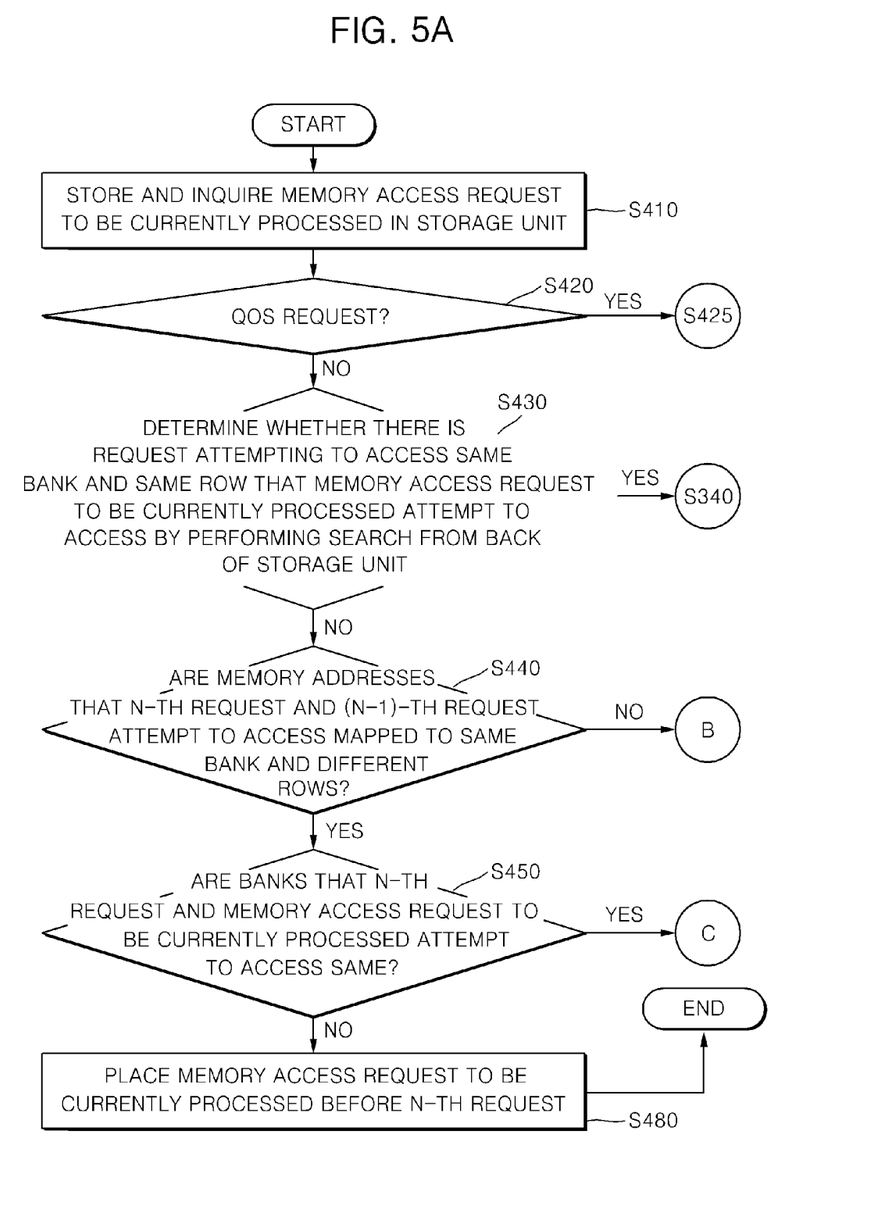
FIGS. 5A and 5B are flowcharts showing a method of controlling memory according to a third embodiment of the present invention.
Figure 5B:
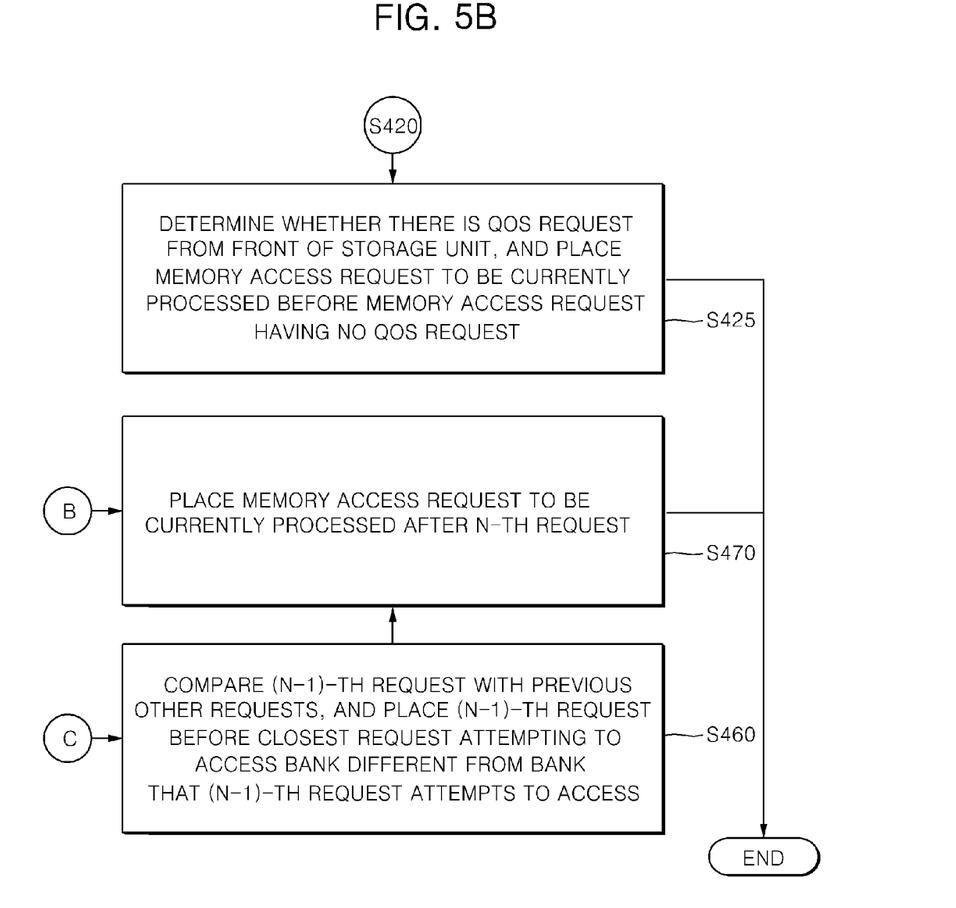

FIGS. 5A and 5B are flowcharts showing a method of controlling memory according to a third embodiment of the present invention.

Referring to FIGS. 5A and 5B, a memory access request to be currently processed is stored in the storage unit 120 and then inquired at step S410. There may be a plurality of other memory access requests before the memory access request to be currently processed, and the plurality of other memory access requests is stored in the storage unit 120. In this case, it is determined whether there is a QoS request at step S420.

If there is a QoS request, the QoS request should be processed earlier than the plurality of normal memory access requests stored in the storage unit 120, so that the QoS request is placed in the foremost part of the storage unit 120 at step S425. Furthermore, if there is a plurality of QoS requests, a new QoS request is placed behind previously received QoS requests in order to allow the previously received QoS request to be processed earlier at step S425.

If there is no QoS request, it is determined whether there is a request attempting to access the same bank and the same row by comparing a memory address which the memory access request to be currently processed attempts to access with those of the plurality of memory access requests stored in the storage unit 120 at step S430. In this case, it is determined whether there is a request meeting the corresponding condition by performing a search from the back of the storage unit 120. This is basically intended to process the memory access requests in the received order.

If, as a result of the comparison, there is no request attempting to access the same bank and the same row as the memory access request to be currently processed at step S430, memory addresses that an n-th request and an (n-1)-th request attempt to access are compared with each other. If the memory addresses are mapped to different rows of the same bank at step S440 and banks that the n-th request and the memory access request to be currently processed attempt to access are different at step S450, the memory access request to be currently processed is placed before the n-th request at step S480. That is, the memory access request to be currently processed is placed before the n-th request, and thus the last three requests do not access the same bank continuously.

In contrast, if the banks that the n-th request and the memory access request to be currently processed attempt to access are the same at step S450, three successive requests access the different rows in the same bank, and therefore the number of waiting cycles increases. Accordingly, in this case, the (n-1)-th request is compared with its previous requests, and the (n-1)-th request is placed before a closest request that attempts to access a bank different from a bank that the (n-1)-th request attempts to access at step S460. The memory access request to be currently processed is placed after the n-th request at step S470. The operation of opening and closing the row of the bank is prevented from being successively performed three times.

Furthermore, if, as a result of the comparison, there is no request attempting to access the same bank and the same row as the memory access request to be currently processed at step S430, a memory address that an n-th request attempts to access is compared with a memory address that an (n-1)-th request attempts to access. If the banks of the memory addresses are different at step S440, the memory access request to be currently processed is placed after the n-th request at S470. If the n-th request and the (n-1)-th request attempt to different banks, there is no benefit that can be obtained when the memory access request to be currently processed is placed between the n-th request and the (n-1)-th request, and therefore the memory access request to be currently processed is placed after the n-th request. Furthermore, if last two requests attempt to access the same bank and the same row, the memory access request to be currently processed is placed at the end because the two requests should be successively processed.

In order to evaluate the results of the implementation of the method of controlling memory according to the present invention, the performances of a variety of memory access patterns are compared with each other. The memory is assumed to be 256 Mb (8 M×32 b) SDR SDRAM having 3-cycle CAS latency, and the waiting time attributable to refresh and the delay time attributable to an on-chip network are ignored. It is assumed that the connection to the memory is established with 32 bits and memory access requests are assumed to be performed via 32-bit 4 burst communication.

Figure 6:
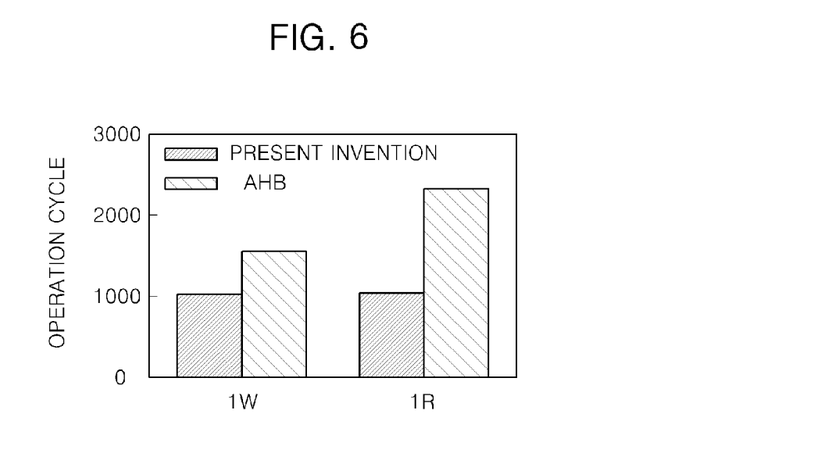
FIG. 6 is a graph showing the analysis results of the performances of the implementation of the method of controlling memory according to the present invention for successive address accesses by a single master compared with that for the AHB.

FIG. 6 is a graph showing the analysis results of the comparison between the performances of the implementation of the method of controlling memory according to the present invention and the implementation of the method of controlling memory for the AHB when successive addresses are accessed by a single master. This corresponds to a case in which a single master reads or writes a large amount of data, such as a picture or a moving image file, from or on consecutive addresses. FIG. 6 shows the results of the comparison of operation cycles that are required to read or write 4 KB data with consecutive addresses. AHB corresponds to the results of the method of controlling memory with a single command processing. This corresponds to the results of comparison between the performances of a single master, which show the effects of outstanding address communication rather than superior results based on the present invention.

Figure 7:
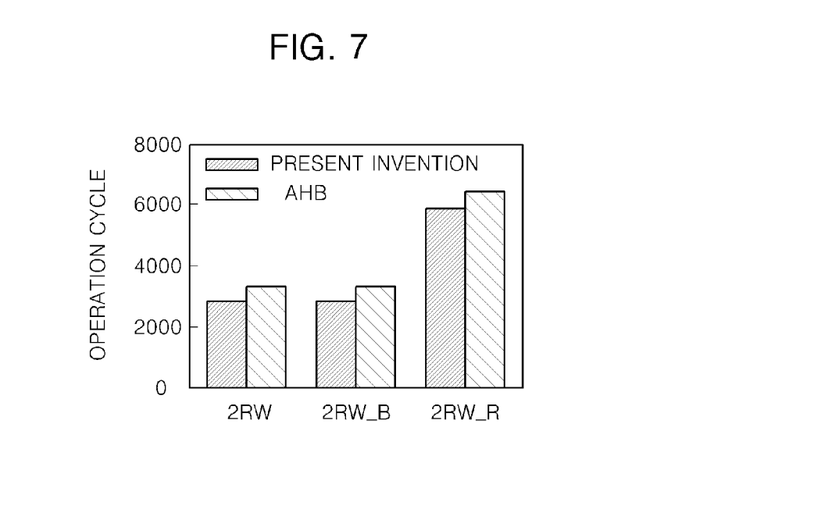
FIG. 7 is a graph showing the analysis results of the performances of the implementation of the method of controlling memory according to the present invention for write-after-read operations by a single master compared with that for the AHB.

FIG. 7 is a graph showing the analysis results of the comparison between the performances of the implementation of the method of controlling memory according to the present invention and the implementation of the method of controlling memory for the AHB when write-after-read operations are performed by a single master. This corresponds to a case in which a single master continuously reads part of a large amount of data, such as a picture or a moving image file, processes the data and writes the data in the memory. The read and write addresses are continuous and there are three cases; a case in which write and read addresses are the same, a case in which write and read addresses are different and are present in different banks, or a case in which write and read addresses are different but are present in the same bank. The first case corresponds to writing read data at the same address after processing, in which case a row can be continuously opened. The second case corresponds to writing read data in a different bank, and is little different from the first case because the rows for reading and writing can be continuously opened. The third case corresponds to a case writing data at different addresses in the same bank, and experiences poor performance because the operation of opening a new row after a read or a write operation should be repeated and the waiting time becomes long. Referring to FIG. 7, 2RW, 2RW_B, and 2RW_R denote the first, second and third cases, respective, in which cases it seems that the effects of the present, invention has not been considerably applied because a single master sequentially makes requests. It can be seen that performance can be improved by outstanding address communication and that the operation of frequently opening and closing a row considerably affects performance.

Figure 8:
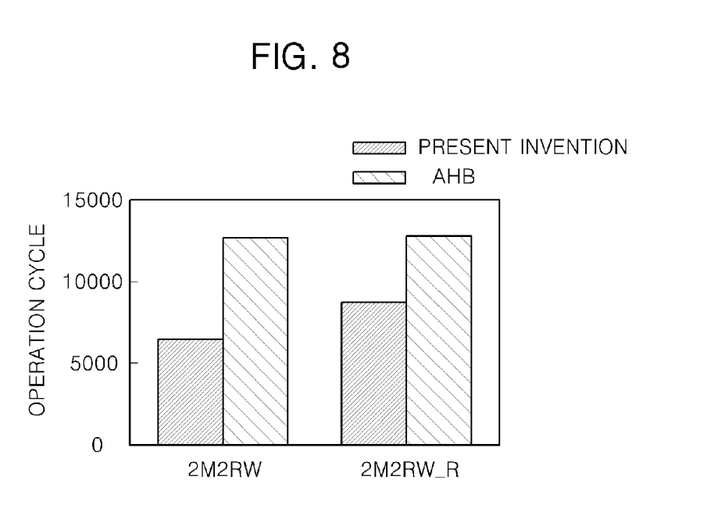
FIG. 8 is a graph showing the analysis results of the performances of the implementation of the method of controlling memory according to the present invention for successive write-after-read operations by two masters compared with that for the AHB.

FIG. 8 is a graph showing the analysis results of the comparison between the performances of the implementation of the method of controlling memory according to the present invention and the implementation of the method of controlling memory for the AHB when successive write-after-read operations are performed by two masters. The two masters alternately repeat write-after-read requests for continuous addresses. This case is complicated because it has a larger number of cases than that with a single master. Accordingly, the performances of extreme cases other than cases having similar performances are analyzed. That is, a case in which read and write are performed on data in the same row of the same bank is compared with a case in which read and write are performed on data in different rows of the same bank. This may frequently occur when still images or movies are processed in parallel. Referring to FIG. 8, 2M2RW designates a case in which data is read and written in the same raw of a bank, and 2M2RW_R designates a case in which read data are written in different rows of a bank. From the results of the comparison between the cases In which the present invention and the AHB-based single command control apparatus are applied, it can be seen that the number of operation cycles is reduced by about 32%~50%. Accordingly, it can be seen that in the case of an application in which multiple masters continuously request a large amount of multimedia data, the present invention is very effective.

Figure 9:
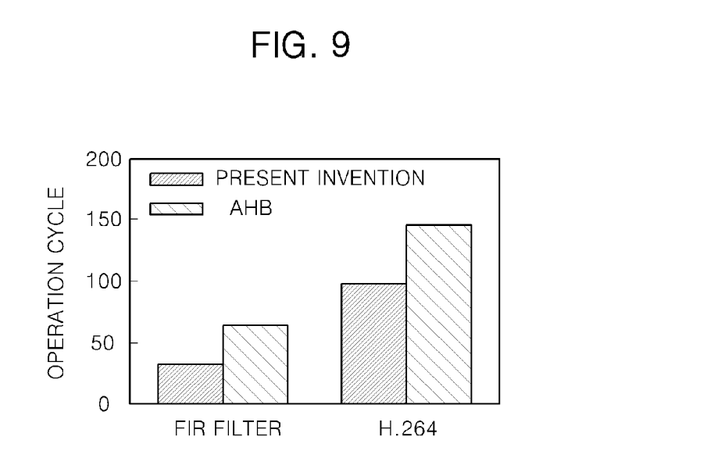
FIG. 9 is a graph showing the comparison between the results of the application of the method of controlling memory according to the present invention to an FIR filter and an H.264 decoder.

FIG. 9 is a graph showing the comparison between the results of the application of the method of controlling memory according to the present invention to an FIR filter and an H.264 decoder and the method for the AHB. In order to evaluate performance when the method according to the present invention is applied to real digital systems, the method according to the present invention is applied to cases in which an FIR filter and an H.264 decoder filters and decodes a given movie, respectively. The FIR filter case corresponds to a case in which master interfaces of four filters continuously read and write image data stored in different rows, and the H.264 case corresponds to a case in which 3 masters continuously read and write image data. From FIG. 9, it can be seen that the present invention shows a 50%~60% improvement of performance compared to the AHB-based single command memory control apparatus.

That is, as described above, it can be seen from the results of the simulations that are applied to the variety of memory access situations and the FIR filter and the H.264 decoder that the present invention has the advantage of improving performance. Furthermore, the present invention is expected to be effective when it is applied to SDRAM memory, rather than SRAM memory, and an SOC for a mobile devices having a limitation on the installation of a memory chip and including multiple processors and a hardware accelerator.

The present invention may be implemented as computer-readable code stored in a computer-readable storage medium. The computer-readable storage medium includes all types of storage devices in which computer system-readable data is stored. Examples of the computer-readable storage medium are Read Only Memory (ROM), Random Access Memory (RAM), Compact Disk-Read Only Memory (CD-ROM), magnetic tape, a floppy disk, and an optical data storage device. Furthermore, the computer-readable storage medium may be implemented as carrier waves (for example, in the case of transmission over the Internet). Moreover, the computer-readable medium may foe distributed across computer systems connected via a network, so that computer-readable code can be stored and executed in a distributed manner.

The semiconductor chip and the method of controlling memory according to the present invention are advantageous in that a plurality of memory access requests are re-ordered, thereby reducing the waiting cycles and maximally utilizing the bandwidth. Furthermore, the semiconductor chip and the method of controlling memory according to the present invention are advantageous in that commands to request memory access are stored in the storage unit, are inquired, and are arbitrated for re-ordering so that the operations of newly opening a row of a bank can be minimized and a command to request QoS can be preferentially processed, thereby reducing the waiting time attributable to the opening of new rows in memory access, increasing the bandwidth, and reducing power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A semiconductor chip for adaptively processing a plurality of commands to request memory access, comprising:
  a storage unit storing a current memory access request and a plurality of memory access requests received before the current memory access request in received order;
  a control unit processing the current memory access request and the plurality of memory access requests received before the current memory access request, which have been stored in the storage unit, in received order, except that memory access requests attempting to access a same bank and a same row are successively processed; and
  a re-ordering unit placing a Quality of Service (QoS) request in a foremost part of the storage unit in order to process the QoS request earlier than the plurality of memory access requests, and to determine whether a priority of the QoS request is present, executing commands according to the priority of the QoS request if the priority of the QoS request is present, and executing commands according to an order of the QoS request as received if the priority of the QoS request is not present, and
  wherein the QoS request guarantees a predetermined data transmission bandwidth for a network and a destination,
  wherein the priority of the QoS is determined based on a predetermined priority policy, and
  wherein the control unit further comprises an inquiry unit analyzing memory addresses that the current memory access request and the plurality of memory access requests received before the current memory access request in reverse order; and
  wherein if there is no request accessing to the same bank and the same row with the current memory access request, the re-ordering unit compares memory addresses between an n-th request and an (n−1)-th request which are a latest memory access request and a second latest memory access request, respectively, in the storage unit before the current memory access request, and places the current memory access request between the (n−1)-th request and the n-th request if the memory addresses of the n-th request and the (n−1)-th request addresses are assigned to different rows of a same bank and if the n-th request and the current memory access request are assigned to different banks.

2. The semiconductor chip of claim 1, wherein if the memory addresses of the n-th request and the (n−1)-th request addresses are assigned to different rows of a same bank and if the n-th request and the current memory access request are assigned to same bank, to place the (n−1)-th request before a closest request which is located ahead of the (n−1)-th request and attempts to access a bank different from a bank that the (n−1)-th request attempts to access and to place the current memory access request after the n-th request.

3. The semiconductor chip of claim 1, wherein the re-ordering unit, if there are a plurality of consecutive requests attempting to access the same bank and the same row with the current memory access request, to place the current memory access request after a latest request of the consecutive requests, if the plurality of consecutive requests attempt to access the same bank and the same row with the current memory access request, and if a number of the plurality of consecutive requests exceeds a preset number, the current memory access request is placed in a received order.

4. A method of controlling memory, the method being performed by an apparatus for controlling semiconductor chip memory for adaptively processing a plurality of commands to request memory access, the method comprising the steps of:
   storing a current memory access request and a plurality of memory access requests received before the current memory access request in a storage unit in received order, and inquiring memory addresses that the requests attempt to access sequentially in reverse order;
   if it is determined that there is a request attempting to access a same bank and a same row with the current memory access request based on the memory addresses inquired in reverse order, placing the current memory access request after the request attempting to access the same bank and the same row;
   placing a Quality of Service (QoS) request in a foremost part of the storage unit in order to process the QoS request earlier than the plurality of normal memory access requests; and
   determining whether a priority of the QoS request is present, executing commands according to the priority of the QoS request if the priority of the QoS request is present, and executing commands according to an order of the QoS request as received if the priority of the QoS request is not present,
   wherein the QoS request guarantees a predetermined data transmission bandwidth for a network and a destination,
   wherein the priority of the QoS is determined based on a predetermined priority policy, and
   wherein the placing the current memory access request further comprises analyzing memory addresses that the current memory access request and the plurality of memory access requests received before the current memory access request in reverse order; and
   wherein if there is no request accessing to the same bank and the same row with the current memory access request, a step of the placing the QoS request further comprises comparing memory addresses between an n-th request and an (n−1)-th request which are a latest memory access request and a second latest memory access request, respectively, in the storage unit before the current memory access request, and placing the current memory access request between the (n−1)-th request and the n-th request if the memory addresses of the n-th request and the (n−1)-th request addresses are assigned to different rows of a same bank and if the n-th request and the current memory access request are assigned to different banks.

5. The method of claim 4, wherein if the memory addresses of the n-th request and the (n−1)-th request addresses are assigned to different rows of a same bank and if the n-th request and the current memory access request are assigned to same bank, placing the (n−1)-th request before a closest request which is located ahead of the (n−1)-th request and attempts to access a bank different from a bank that the (n−1)-th request attempts to access and placing the current memory access request after the n-th request.

6. The method of claim 4, wherein the placing the QoS request further comprises, if there are a plurality of consecutive requests attempting to access the same bank and the same row with the current memory access request, placing the current memory access request after a latest request of the consecutive requests, and if the plurality of consecutive requests attempt to access the same bank and the same row with the current memory access request and if a number of the plurality of consecutive requests exceeds a preset number, placing the current memory access request in a received order.

7. A semiconductor chip for adaptively processing a plurality of commands to request memory access, comprising:
   a storage unit storing a current memory access request and a plurality of memory access requests received before the current memory access request in received order;
   a control unit processing the current memory access request and the plurality of memory access requests received before the current memory access request, which have been stored in the storage unit, in received order, except that memory access requests attempting to access a same bank and a same row are successively processed; and
   a re-ordering unit placing a Quality of Service (QoS) request in a foremost part of the storage unit in order to process the QoS request earlier than the plurality of memory access requests, and to determine whether a priority of the QoS request is present, executing commands according to the priority of the QoS request if the priority of the QoS request is present, and executing commands according to an order of the QoS request as received if the priority of the QoS request is not present,
   wherein the QoS request guarantees a predetermined data transmission bandwidth for a network and a destination,
   wherein the priority of the QoS is determined based on a predetermined priority policy,
   wherein if there are a plurality of consecutive requests attempting to access the same bank and the same row with the current memory access request, the re-ordering unit places the current memory access request after a latest request of the consecutive requests,
   wherein if the plurality of consecutive requests attempt to access the same bank and the same row with the current memory access request, and if a number of the plurality of consecutive requests exceeds a preset number, the current memory access request is placed in a received order.

* * * * *